Figure 1:
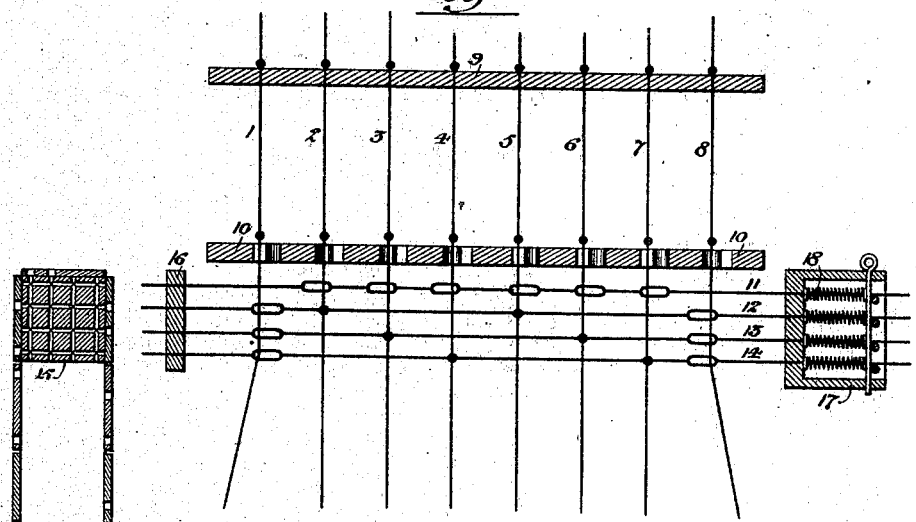

No. 723,153. PATENTED MAR. 17, 1903.
H. HARDWICK.
JACQUARD MECHANISM FOR LOOMS.
APPLICATION FILED JAN. 4, 1901.
NO MODEL. 16 SHEETS—SHEET 1.

Witnesses:
Inventor:
Harry Hardwick.
by his Attorneys:

No. 723,153. PATENTED MAR. 17, 1903.
H. HARDWICK.
JACQUARD MECHANISM FOR LOOMS.
APPLICATION FILED JAN. 4, 1901.
NO MODEL. 16 SHEETS—SHEET 2.
Fig. 4.
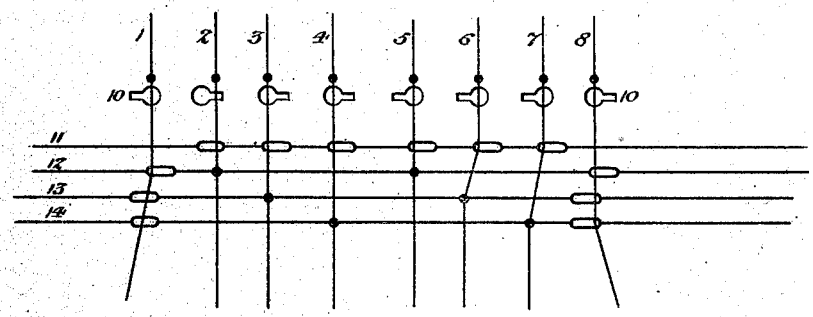
Fig. 5.
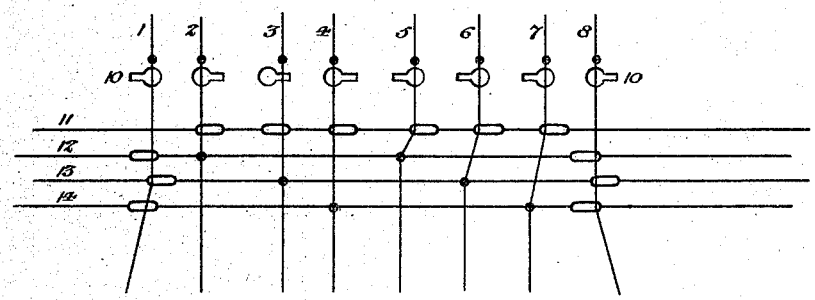
Fig. 6.
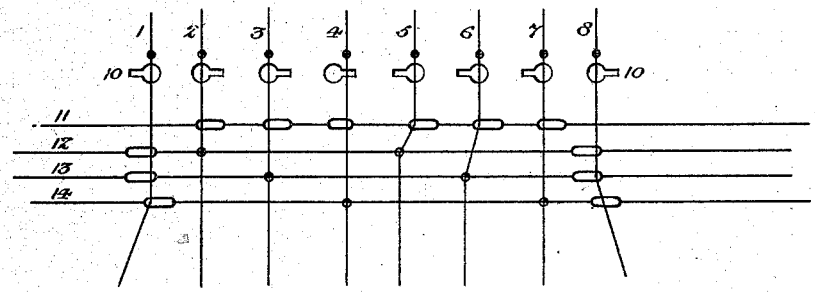
Fig. 7.
Witnesses: Inventor:—
Harry Hardwick
by his Attorneys No. 723,153. PATENTED MAR. 17, 1903.
H. HARDWICK.
JACQUARD MECHANISM FOR LOOMS.
APPLICATION FILED JAN. 4, 1901.
NO MODEL. 16 SHEETS—SHEET 3.
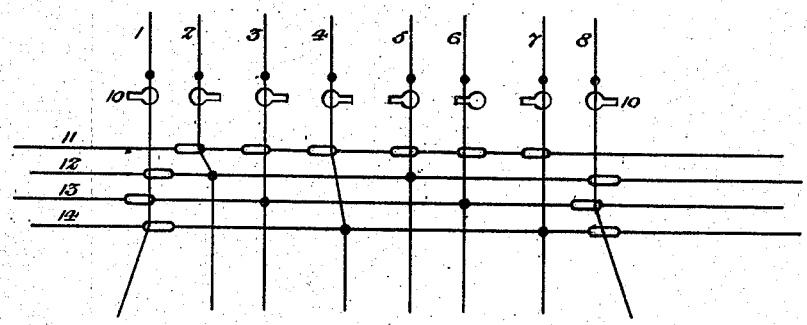
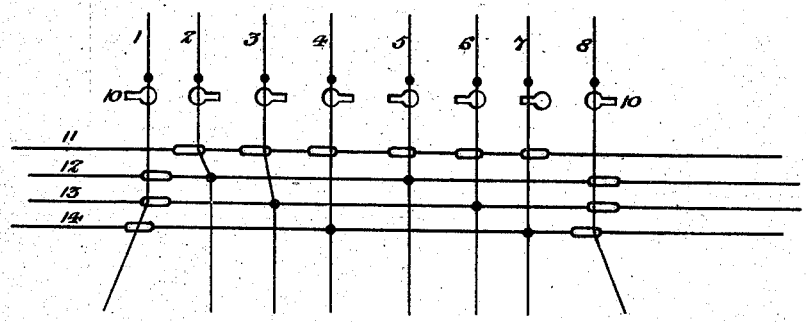
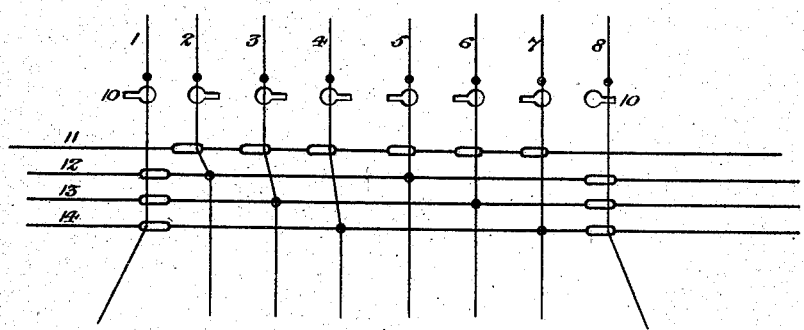
Witnesses.
Inventor:—
Harry Hardwick
by his Attorneys:—

No. 723,153. PATENTED MAR. 17, 1903.
H. HARDWICK.
JACQUARD MECHANISM FOR LOOMS.
APPLICATION FILED JAN. 4, 1901.
NO MODEL. 16 SHEETS—SHEET 4.

Witnesses:-
Louis M. F. Whitehead.
Herman E. Metius.

Inventor:-
Harry Hardwick.
by his Attorneys:-
Howson & Howson

No. 723,153. PATENTED MAR. 17, 1903.
H. HARDWICK.
JACQUARD MECHANISM FOR LOOMS.
APPLICATION FILED JAN. 4, 1901.
NO MODEL. 16 SHEETS—SHEET 6.

Witnesses:—
Louis W. Whitehead.
Herman E. Metius.

Inventor:—
Harry Hardwick.
by his Attorneys:—
Howson & Howson

No. 723,153. PATENTED MAR. 17, 1903.
H. HARDWICK.
JACQUARD MECHANISM FOR LOOMS.
APPLICATION FILED JAN. 4, 1901.
NO MODEL. 16 SHEETS—SHEET 7.

Witnesses:—
Louis H. Whitehead
Norman E. Metius

Inventor
Harry Hardwick
by his Attorneys
Howson & Howson

No. 723,153. PATENTED MAR. 17, 1903.
H. HARDWICK.
JACQUARD MECHANISM FOR LOOMS.
APPLICATION FILED JAN. 4, 1901.
NO MODEL. 16 SHEETS—SHEET 8.
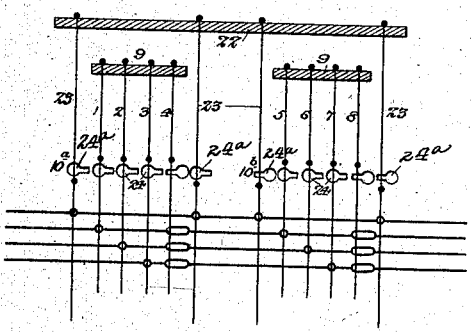
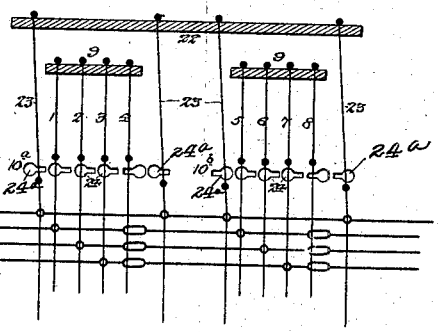
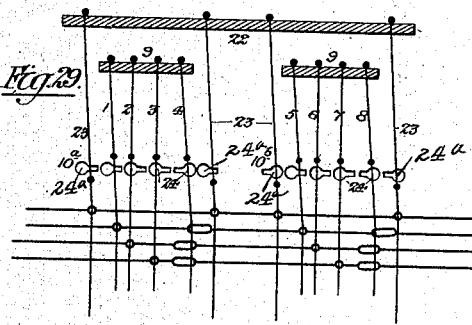
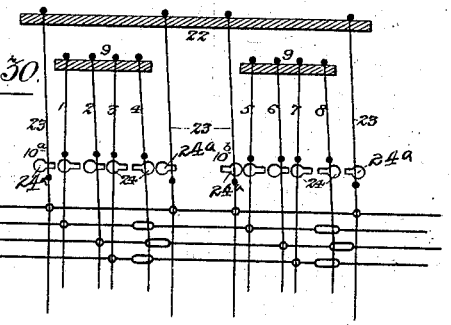
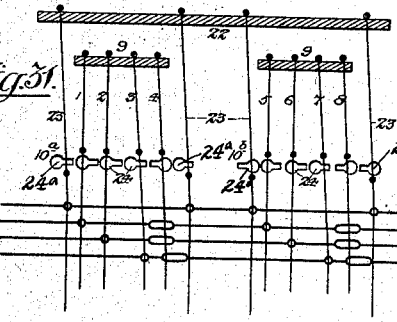
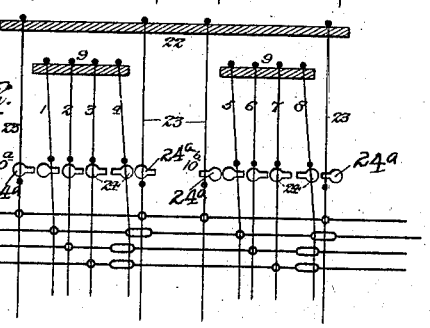
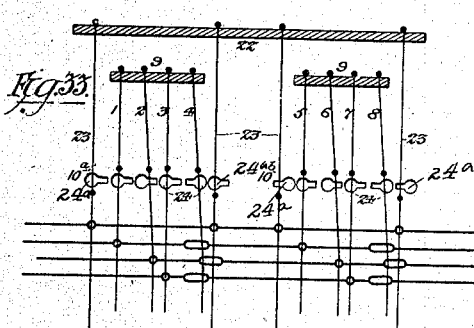
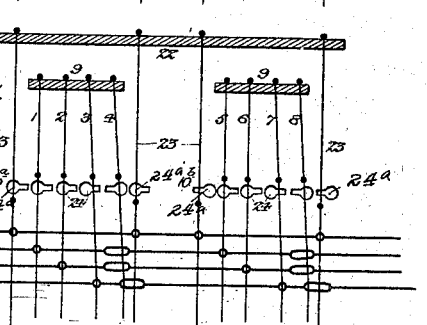

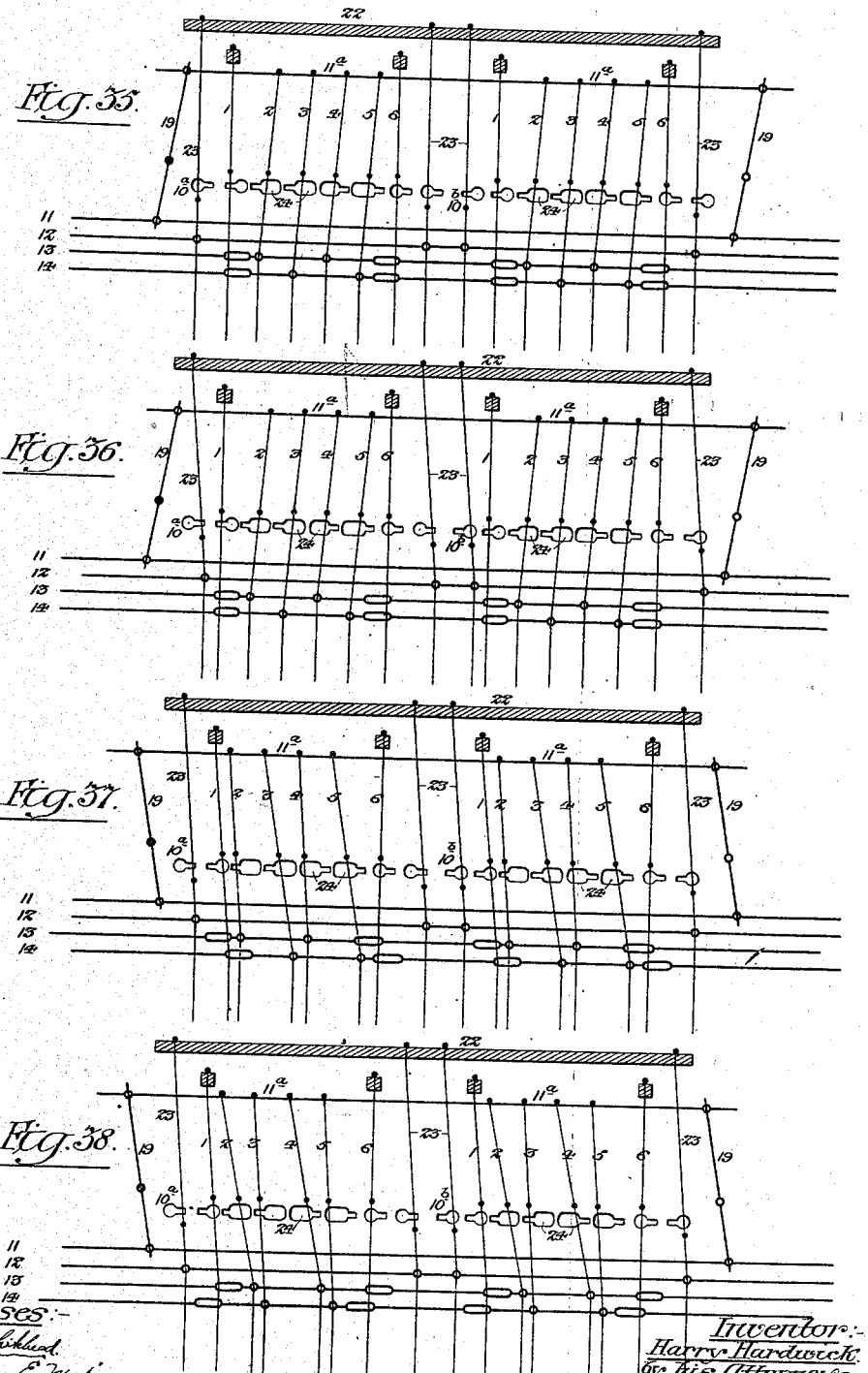

No. 723,153. PATENTED MAR. 17, 1903.
H. HARDWICK.
JACQUARD MECHANISM FOR LOOMS.
APPLICATION FILED JAN. 4, 1901.
NO MODEL. 16 SHEETS—SHEET 10.
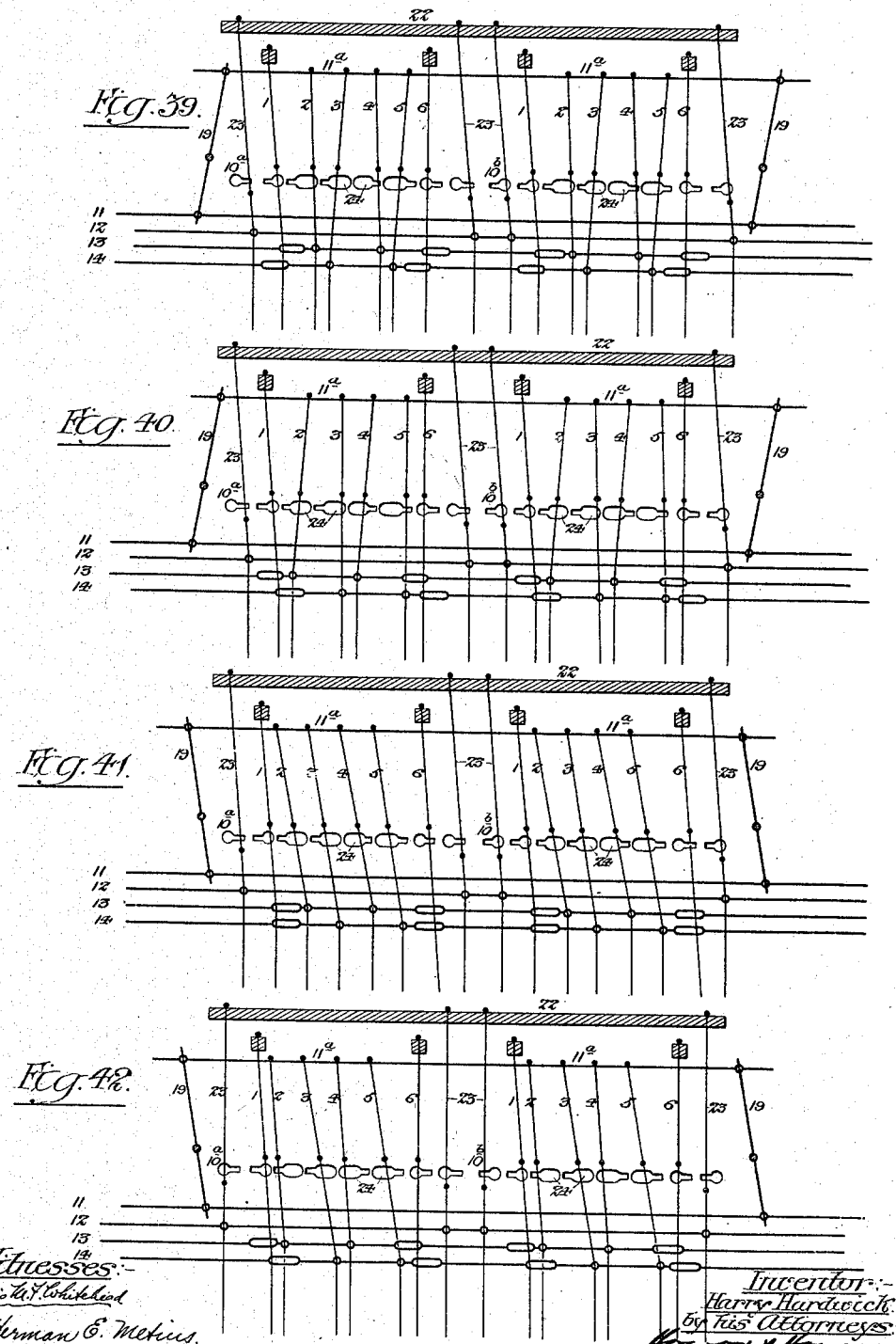

No. 723,153. PATENTED MAR. 17, 1903.
H. HARDWICK.
JACQUARD MECHANISM FOR LOOMS.
APPLICATION FILED JAN. 4, 1901.
NO MODEL. 16 SHEETS—SHEET 11.
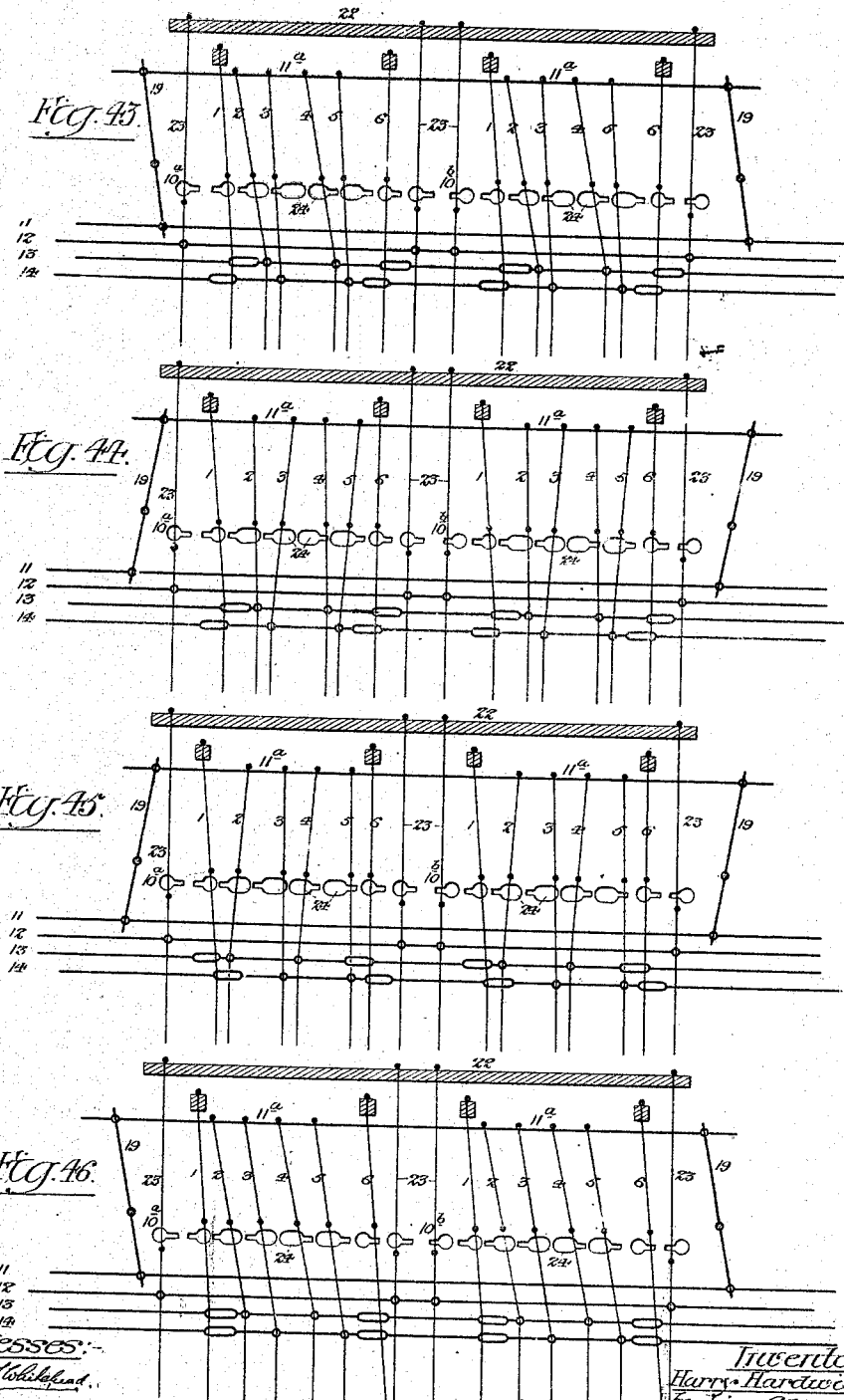

No. 723,153. PATENTED MAR. 17, 1903.
H. HARDWICK.
JACQUARD MECHANISM FOR LOOMS.
APPLICATION FILED JAN. 4, 1901.
NO MODEL.
16 SHEETS—SHEET 13.
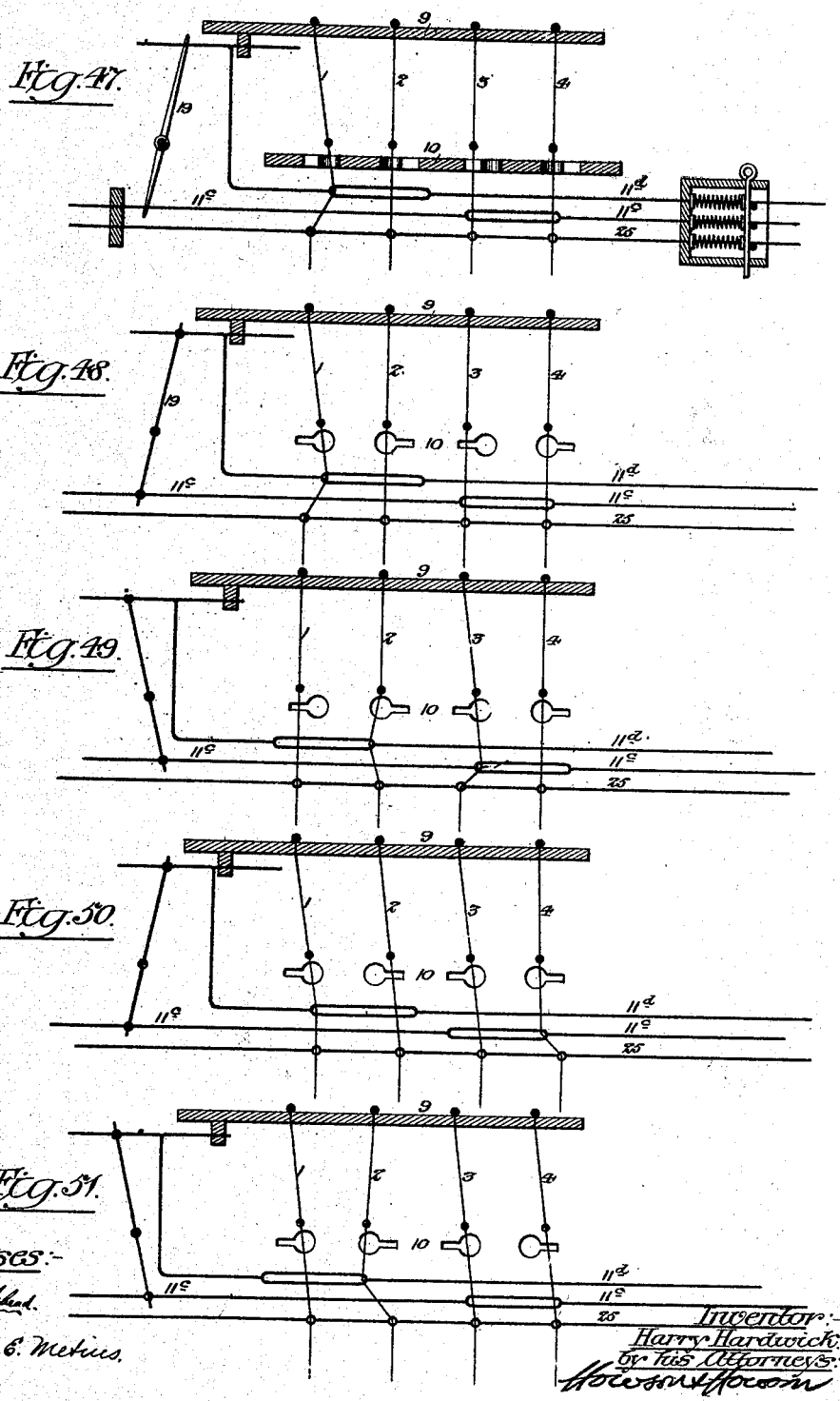

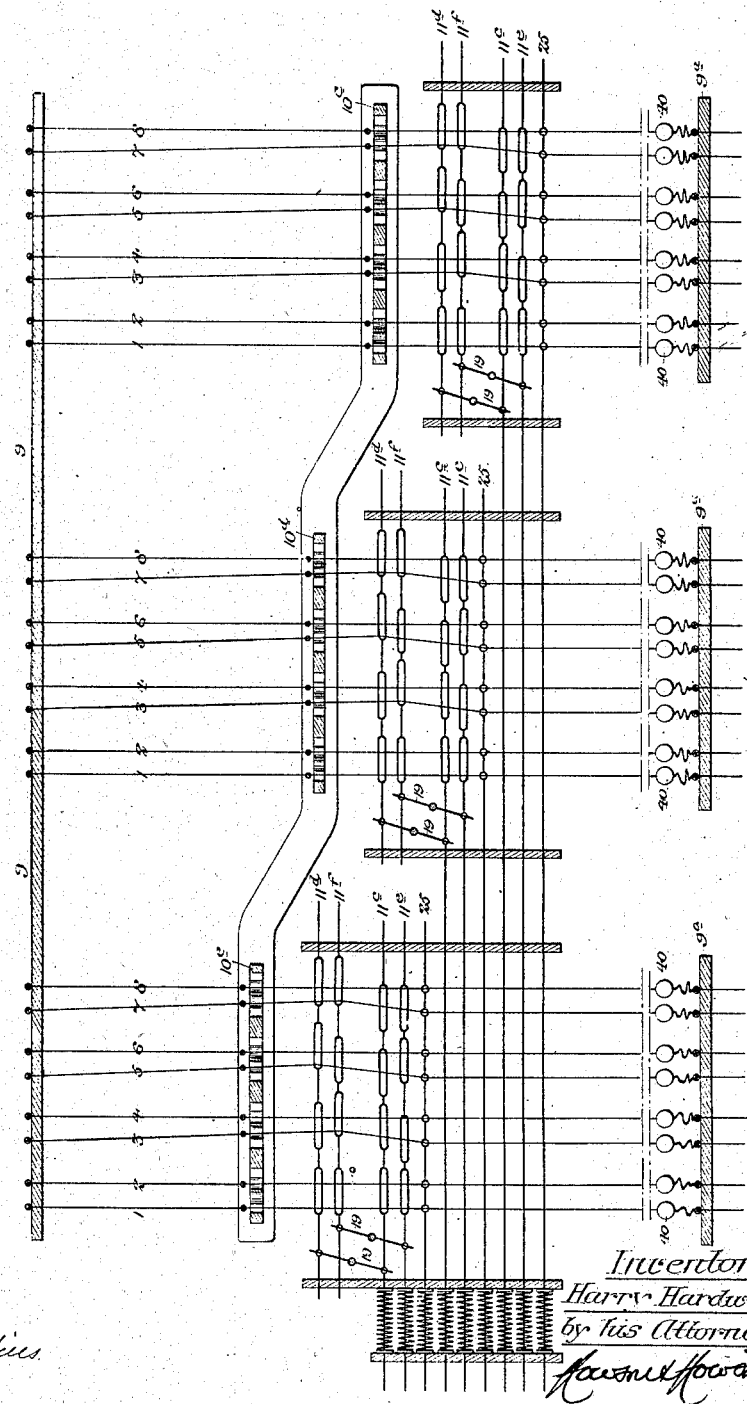

No. 723,153. PATENTED MAR. 17, 1903.
H. HARDWICK.
JACQUARD MECHANISM FOR LOOMS.
APPLICATION FILED JAN. 4, 1901.
NO MODEL. 16 SHEETS—SHEET 14.
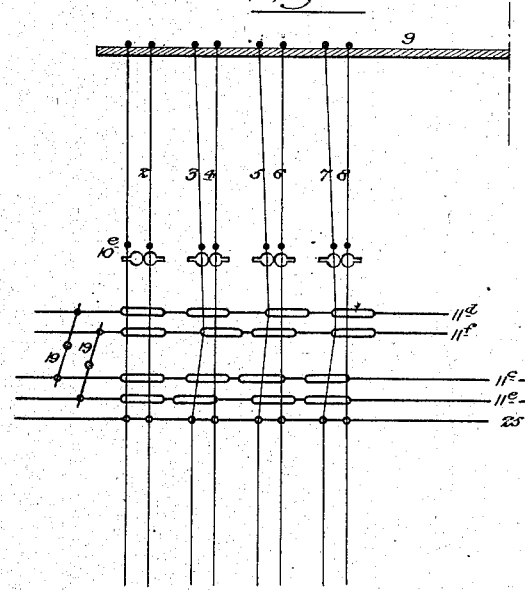
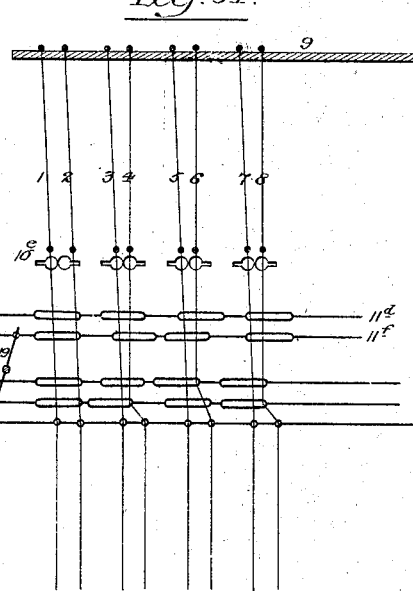
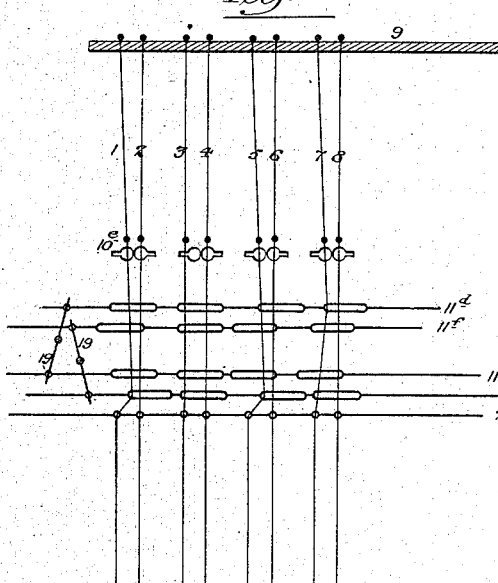
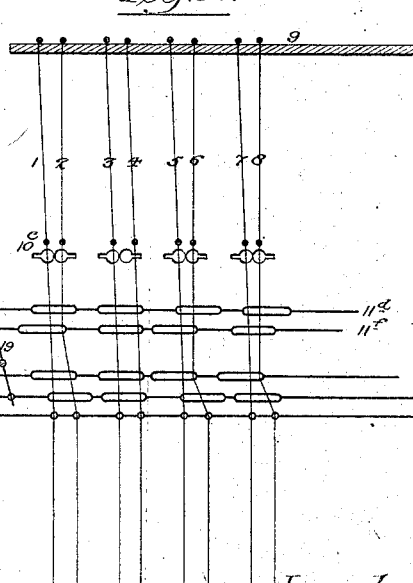
Witnesses:—
Louis M. F. Whitehead.
Herman E. Metius.
Inventor:
Harry Hardwick.
by his Attorneys:—
Howson & Howson No. 723,153. PATENTED MAR. 17, 1903.
H. HARDWICK.
JACQUARD MECHANISM FOR LOOMS.
APPLICATION FILED JAN. 4, 1901.
NO MODEL. 16 SHEETS—SHEET 15.

Witnesses:—

Inventor:—
Harry Hardwick
by his Attorneys

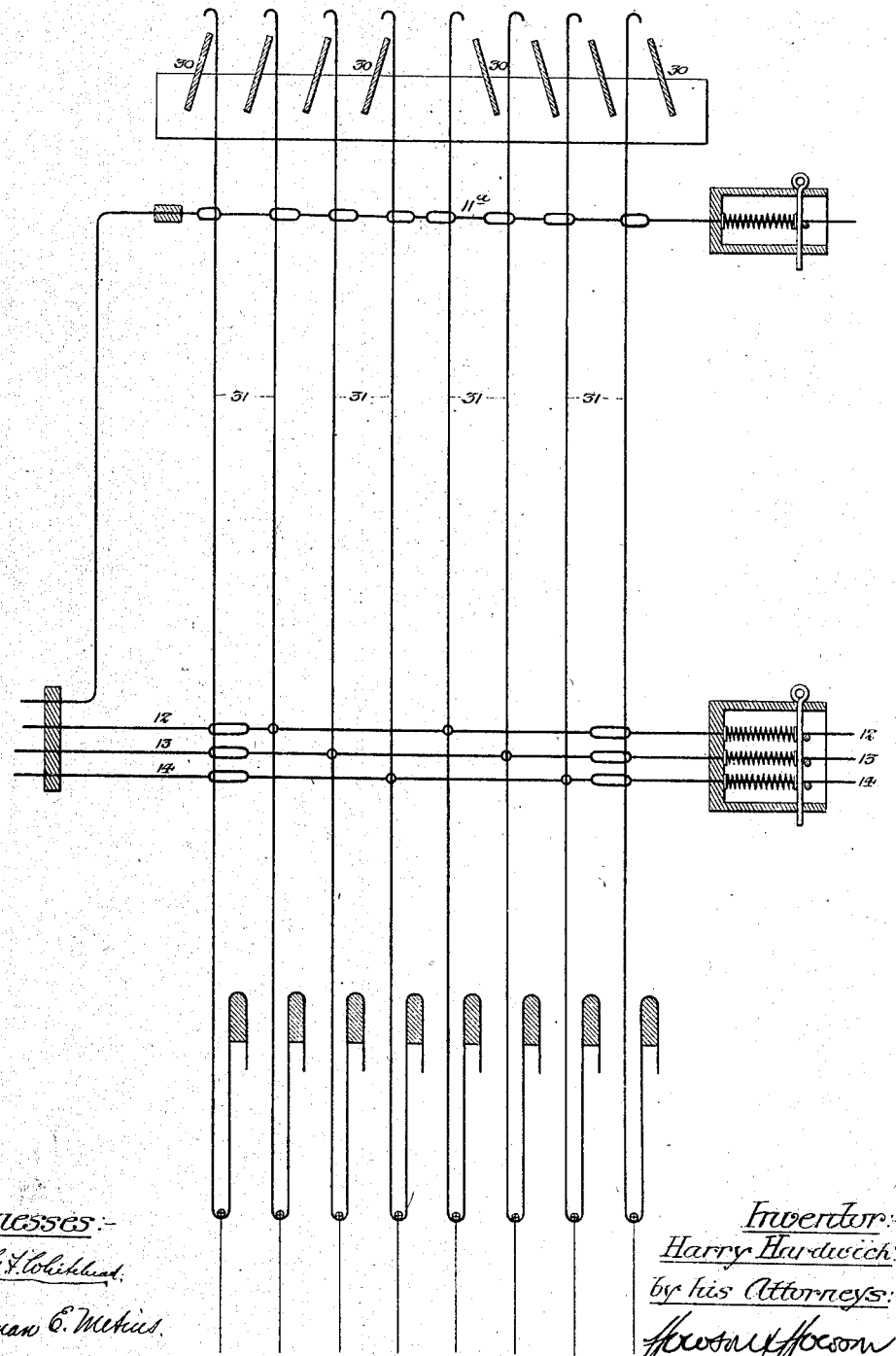

UNITED STATES PATENT OFFICE.

HARRY HARDWICK, OF PHILADELPHIA, PENNSYLVANIA, ASSIGNOR TO IVINS, DIETZ AND METZGER COMPANY, OF PHILADELPHIA, PENNSYLVANIA, A CORPORATION OF PENNSYLVANIA.

JACQUARD MECHANISM FOR LOOMS.

SPECIFICATION forming part of Letters Patent No. 723,153, dated March 17, 1903.

Application filed January 4, 1901. Serial No. 42,124. (No model.)

*To all whom it may concern:*

Be it known that I, HARRY HARDWICK, a citizen of the United States, residing in Philadelphia, Pennsylvania, have invented certain Improvements in Jacquard Mechanism for Looms, of which the following is a specification.

My invention relates to that class of jacquard-machines for looms in which the harness cords or wires are controlled by a lesser number of needles, the special features of construction and combinations of parts constituting my invention being fully set forth and specifically claimed hereinafter.

Figure 2:
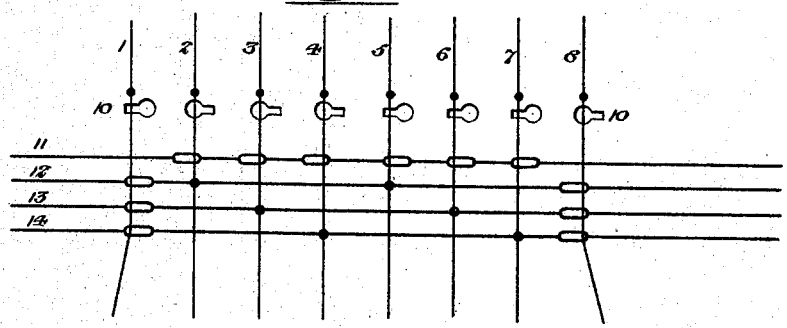
Figure 11:
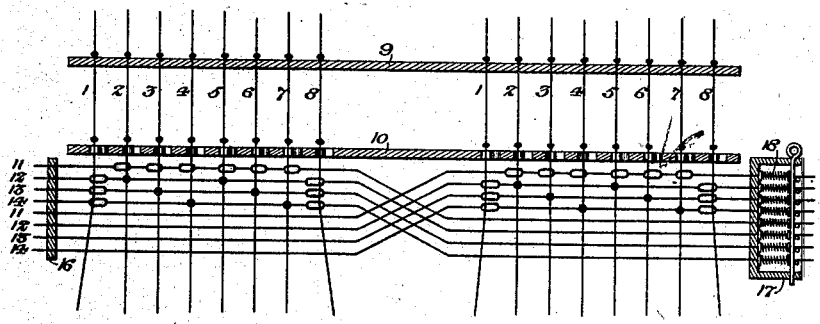
Figure 15:
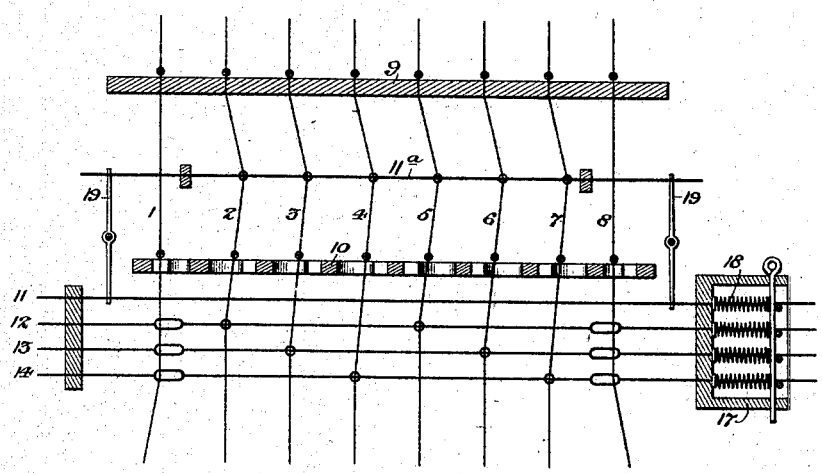
Figure 16:
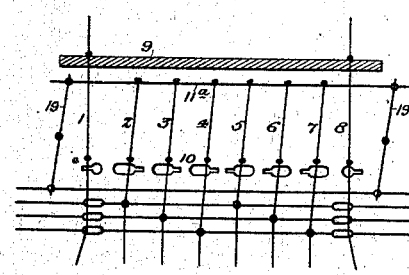
Figure 17:
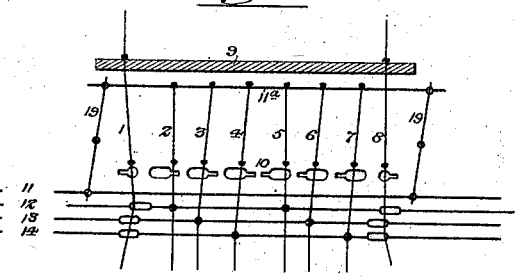
Figure 18:
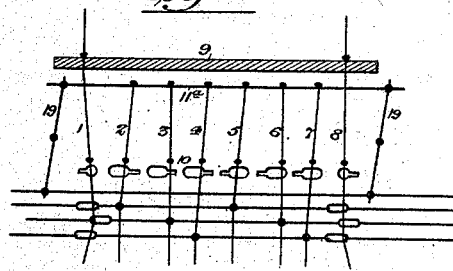
Figure 19:
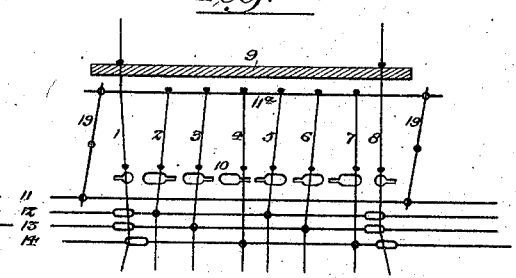
Figure 20:
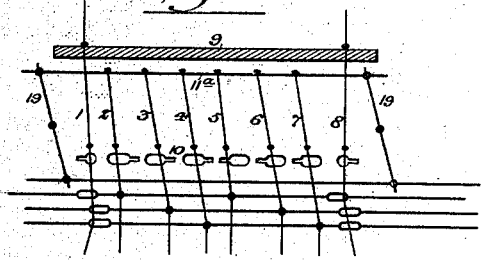
Figure 21:
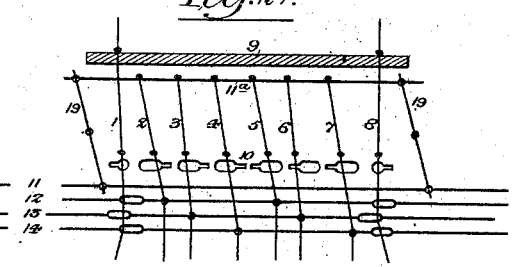
Figure 22:
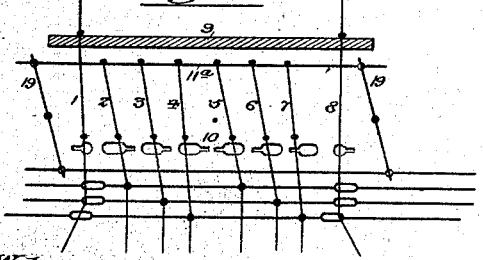
Figure 23:
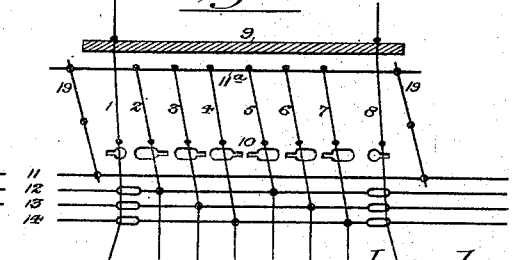
Figure 25:
Figure 24:
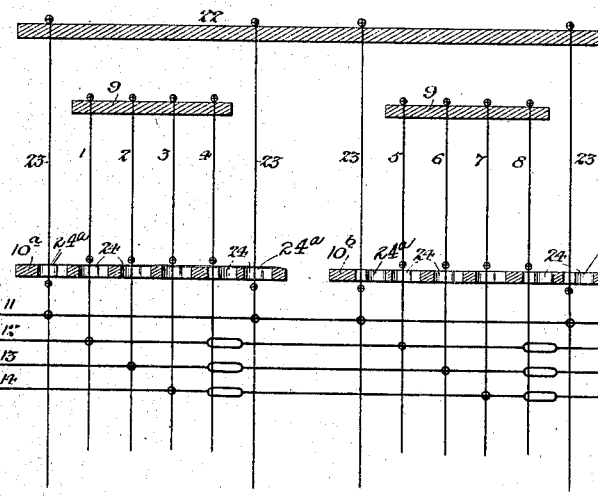
Figure 26:
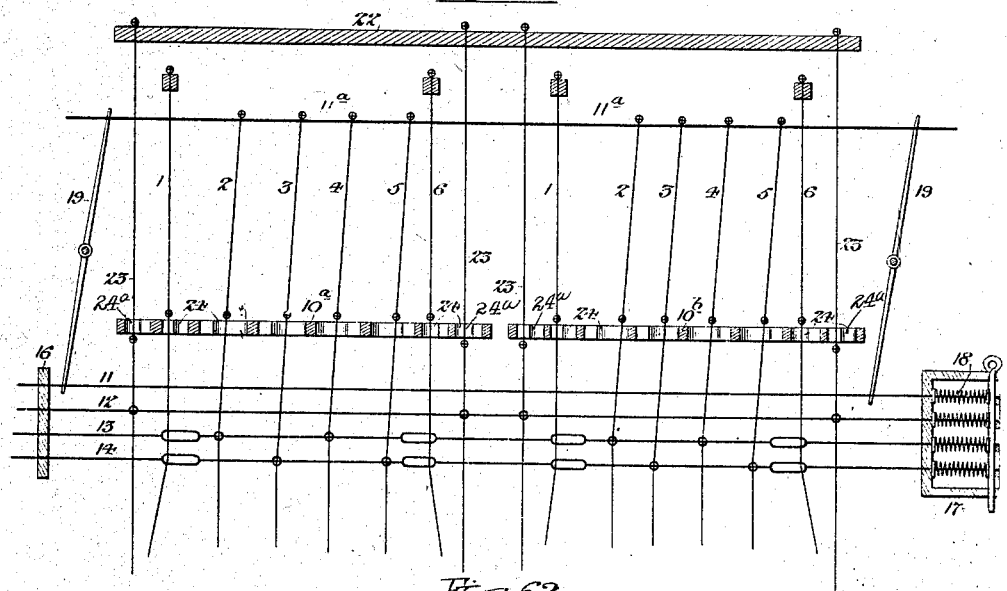

In the accompanying drawings, Figure 1 is a sectional view of sufficient of the elements of a well-known form of jacquard-machine to illustrate my invention. Fig. 2 is a diagram illustrating the position occupied by the needles and harness-cords of the jacquard-machine when the parts are at rest or in their normal position. Figs. 3, 4, 5, 6, 7, 8, 9, and 10 are similar diagrams illustrating the operation of the needles in order to "call" or put in position for being lifted any one of the eight harness-cords represented in Fig. 1. Fig. 11 is a view illustrating a method of applying the construction shown in Fig. 1 to a jacquard-machine of greater capacity. Figs. 12, 13, 14, and 15 are views illustrating another method of carrying out my invention. Fig. 16 is a diagram representing the normal position of the needles and harness-cords in a jacquard-machine of the character shown in Fig. 12, this position of the parts "calling" one of the eight harness-cords represented. Figs. 17 to 23, inclusive, are views illustrating the operation of the needles in order to call any one of the other seven harness-cords shown. Fig. 24 is a representation of another form of jacquard-machine embodying my invention. Fig. 25 represents a transverse section of part of such machine. Fig. 26 is a view representing a combination of the constructions shown in Figs. 12 and 24. Fig. 27 is a diagram representing the normal position of the needles and harness-cords in a jacquard-machine of the character shown in Fig. 24, this position of the parts calling one of the eight harness-cords represented. Figs. 28 to 34, inclusive, are similar diagrams representing the operation of the needles in order to call any one of the seven other harness-cords shown. Fig. 35 is a diagram illustrating the normal position of the needles and harness-cords in a jacquard-machine of the character shown in Fig. 26, this position of the parts calling one of the twelve harness-cords represented. Figs. 36 to 46, inclusive, are similar diagrams illustrating the operation of the needles whereby any one of the eleven other harness-cords represented in Fig. 26 may be called. Fig. 47 is a view similar to Fig. 1, but illustrating another embodiment of my invention. Fig. 48 is a diagram illustrating the normal position of the needles and harness-cords in a machine of the character shown in Fig. 47, this position of the parts calling one of the four harness-cords represented. Figs. 49 to 51, inclusive, are similar diagrams illustrating the method of operating the needles so as to call any one of the three other harness-cords shown. Fig. 52 is a sectional view similar to Fig. 47, but illustrating the embodiment of the idea there represented in a machine of greater capacity. Fig. 53 is a diagram illustrating the normal position of one set of needles and harness-cords in a machine of the character shown in Fig. 52, this position of the parts calling one of the eight harness-cords represented. Figs. 54 to 60, inclusive, are similar diagrams showing the operation of the needles in order to call any one of the other seven harness-cords shown. Fig. 61 is a view illustrating the application of my invention to a machine in which the lifter-wires and griff-bars are employed in place of knotted cords and notched lifter-bars; and Fig. 62, Sheet 7, is a view illustrating a modified plan of forming the notched eyes of the lifter-boards.

In Fig. 1 are represented parts of a jacquard-machine common in various forms of loom, notably those employed for the weaving of carpet, upholstery, and other fabrics, 9 representing a stationary board or plate, from which are suspended the harness-cords, of which eight are shown in the present instance, numbered, respectively, 1, 2, 3, 4, 5, 6, 7, and 8, these cords passing through perforations in the supporting-board 9 and being provided with knots or other retaining means above said board. The harness-cords also pass through notched eyes in the lifter-board 10, to which movement of vertical reciprocation may be imparted in the ordinary manner, each harness-cord having a knot or other formation located above the lifter-board when the latter is depressed and serving as a means whereby the harness-cord may be caused to engage with and be lifted by the lifter-board when said harness-cord is moved into the notch of its respective eye. Below the lifter-board are mounted the jacquard-needles, of which I have in Fig. 1 shown but one vertical row of four, numbered, respectively, 11, 12, 13, and 14, it being understood, however, that in the complete machine the number of sets of four needles in the vertical row may be repeated one or more times, and as many of the vertical rows of needles disposed side by side will be used as may be necessary with corresponding repetitions of the sets of harness-cords. The card-cylinder of the machine is represented at 15, said cylinder being intended to be mounted in the usual way, so as to be moved from and toward one end of the series of needles, the latter being mounted so as to slide in suitable guides 16 and 17 and being acted upon by springs 18, whose tendency is to project the needles toward the card-cylinder to an extent limited by suitable stops. I may say, however, that in this, as in all the subsequent forms of jacquard-machine which I will describe, the springs may be dispensed with if the harness-cords are so guided as to exert a pull upon the needles tending to move them toward the card-cylinder. The use of springs is preferred, however, in all cases. The eyes of the lifter-board 10, which correspond with the harness-cords 2, 3, and 4, have their notches at the right, while the eyes in said lifter-board corresponding with the harness-cords 5, 6, and 7 have their notches at the left, as shown in Fig. 2, and each of the needles 12, 13, and 14 controls two of the harness-cords. Thus the needle 12 controls the cords 2 and 5, the needle 13 controls the cords 3 and 6, and the needle 14 controls the cords 4 and 7, and these needles act to move the harness-cords into or out of the notches of their respective eyes. The harness-cords 2, 3, and 4 normally occupy the eyes in the lifter-board, so that the latter can be raised without engagement with the knots of these harness-cords and without lifting the same; but the harness-cords 5, 6, and 7 normally occupy the notches of their eyes in the lifter-board, and hence would be raised by the latter unless pushed by the needles out of the notches and into the eyes. For instance, if it is desired to lift the cord 5 a blank portion of a card on the cylinder 15 would be pushed upon the needles 13 and 14, so as to carry the harness-cords 6 and 7 into the eyes and permit the cord 5 to remain in the notch, and in like manner the cord 6 can be lifted by pushing the needles 12 and 14 and the cord 7 by pushing the needles 12 and 13. As each of the needles, however, controls also one of the other harness-cords 2, 3, or 4 and as the pushing of either harness-cord 5, 6, or 7 out of its notch is therefore accompanied by a movement of the corresponding harness-cord 2, 3, or 4 into its notch it would be impossible to lift one cord at a time in the absence of some means for preventing a cord of one set from being pushed into its notch at the time that a cord of the other set was being pushed out of its notch, and this means I provide in the needle 11, which may be termed a "qualifying-needle," since it qualifies the action of needles 12, 13, and 14 by partially neutralizing such action. The needle 11 has elongated eyes, one for each of the harness-cords 2 to 7, inclusive, and its action upon said cords will be understood upon reference to Figs. 2 and 3. Thus when the needle is in the retracted position shown in Fig. 2 it exercises a restraining influence upon the harness-cords 2, 3, and 4 and prevents either of these cords from being pushed into the notch of its eye in the lifter-board by the action of either of the needles 12, 13, or 14, no such restraining effect being exercised upon the cords 5, 6, and 7, however, as each of said cords can play in the elongated eye of the needle 11 in order to permit it to be moved by its controlling-needle 12, 13, or 14 out of the notch and into the eye of the lifter-board. When the needle 11 is projected, however, by contact with a blank portion of the card on the cylinder 15, the conditions are reversed, as will be understood on reference to Fig. 3, the elongated eyes of the needle now permitting either of the harness-cords 2, 3, or 4 to be moved into the notch of its lifter-board eye, while the cords 5, 6, and 7 are moved out of their notches and into the eyes, so that their position is not affected by any movement of the needles 12, 13, and 14. At each end of each of the needles 12, 13, and 14 are elongated eyes, through which pass the harness-cords 1 and 8, the harness-cord 1 normally occupying the notch of an eye at one end of the lifter-board and the harness-cord 8 normally occupying an eye at the other end of the board, which has its notch in a direction the reverse of that of the eye corresponding to the cord 1. The lateral strain upon the lower portion of the harness-cord 1 normally draws said cord against the forward ends of the elongated eyes at one end of the set of needles, while the lateral strain upon the harness-cord 8 draws it against the opposite ends of the eyes at the other end of the set of needles. Forward movement of either of the needles 12, 13, or 14 will therefore move the harness-cord 1 out of its notch and a retracted condition of either of the needles 12, 13, or 14 will prevent the harness-cord 8 from entering its notch. Hence the harness-cord 1 is operative only when all three of the needles 12, 13, and 14 are permitted to remain retracted, and the harness-cord 8 is operative only when all three of the needles 12, 13, and 14 are pushed forward.

Figure 3:
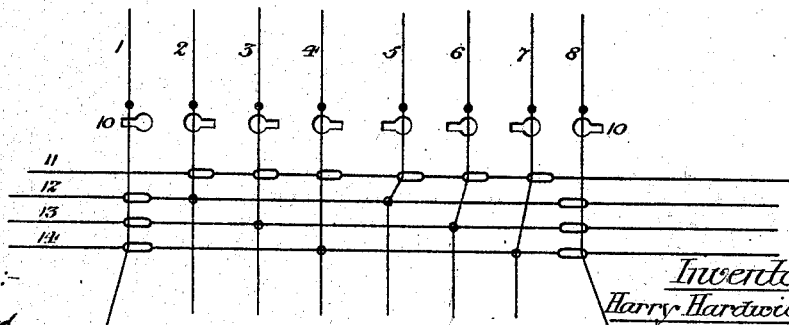

It being borne in mind that each of the harness-cords can be lifted only when it occupies the notch of its eye in the lifter-board, the operation of the needles in order to effect the calling or putting into position to be lifted of any one of the eight harness-cords illustrated in Fig. 1 will be understood on reference to Figs. 3 to 10, inclusive, Fig. 3 representing the position of the needles when the cord 1 is to be called, and Figs. 4, 5, 6, 7, 8, 9, and 10 showing the operation of the needles in order to effect a calling of the cords 2, 3, 4, 5, 6, 7, and 8, respectively. By the use of four needles, therefore, I am enabled to control any one of eight harness-cords, thereby materially reducing the number of needles usually employed with corresponding simplification of the machine and reduction in area and number of pattern-cards required. If it is desired to use a jacquard having eight needles in a vertical row so as to employ a card of the usual width and a card-cylinder of the usual size, I simply provide the lifter-board shown in Fig. 1 with a duplicate set of notched eyes, as in Fig. 11, and in this case the needles may be crossed at the center, so that the controlling-eyes of each set of needles may be as close to the lifter-board as possible. For instance, as shown in Fig. 11, there is a vertical row of eight needles; but none of the harness-cord-controlling eyes of the needles are removed to a greater extent than four needles from the lifter-board. Hence the movement of the harness-cords into and from the notches of the lifter-board can be effected without such extended movement of the needles as would be required in the absence of this feature of construction. A preferable way of accomplishing this result will, however, be described hereinafter in connection with Fig. 52.

Figure 12:
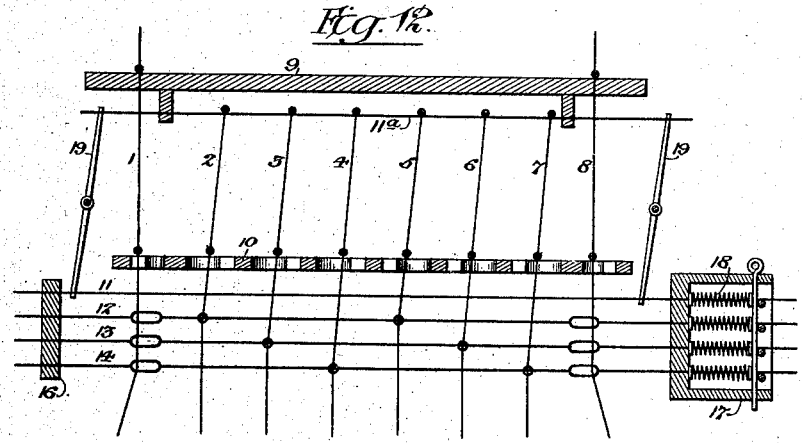
Figure 13:
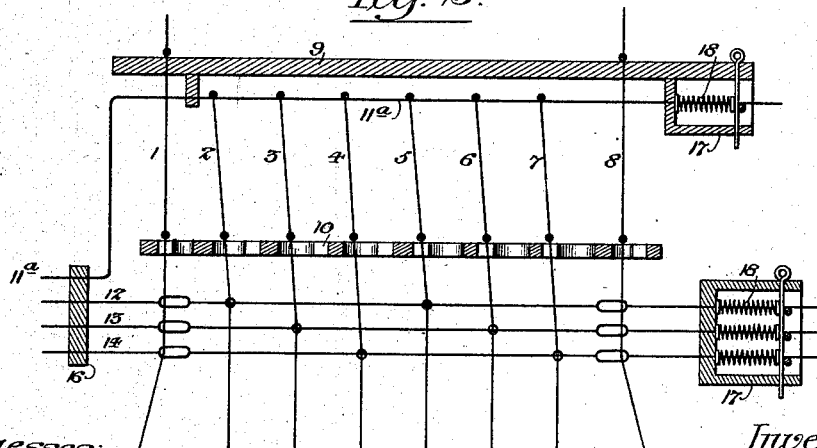
Figure 14:
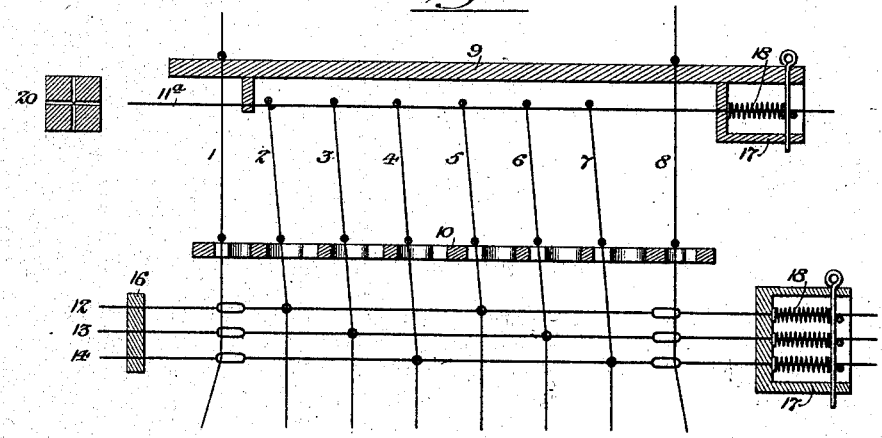

In the jacquard-machine shown in Figs. 12, 13, and 14 the qualifying-needle is shown at 11ª and is mounted above the lifter-board and serves as a means of suspending the harness-cords 2, 3, 4, 5, 6, and 7. As shown in Fig. 12, the qualifying-needle 11ª is operated by a needle 11, forming one of the set of needles actuated by the cards, movement being transmitted to the needle 11ª from the needle 11 through a lever connection comprising a lever 19 at each end of the machine, although but one lever may be used, if desired. In the construction shown in Fig. 13 the needle 11ª is simply bent downward at one end of the machine, so as to terminate in a position to be acted upon by the cards on the card-cylinder, while in the construction shown in Fig. 14 a special card-cylinder 20 is employed for actuating the needle 11ª. In the construction shown in Fig. 15 the qualifying-needle 11ª is mounted between the suspending-board 9 and the lifter-board 10 and simply exercises lateral control over the harness-cords, but does not provide any vertical support therefor. As shown in Fig. 15, the qualifying-needle 11ª is operated in the same manner as in Fig. 12; but it is manifest that it may be operated by either of the other plans suggested.

When the method of construction shown in Figs. 12 to 15 is adopted, it is preferable to elongate the eyes of the lifter-board, for the reason that each harness-cord has considerable lateral play within its eye, and if the latter was not thus elongated the cords would be worn by contact with the board when they were moved to the extreme position away from the notch.

The diagrams Figs. 16 to 23 illustrate the operation of the needles and harness-cords in order to call any one of the eight cords in a machine of the character shown in Figs. 12 or 15, and from these diagrams it will be readily understood how the needles are to be operated in order to call any one of the eight threads in machines of the character shown in Figs. 13 and 14.

In that form of my improved jacquard-machine which is shown in Figs. 24 and 25 the lifter-board is divided into two sections 10ª and 10ᵇ, and the qualifying-needle 11 instead of controlling the position of the harness-cords, so as to render them operative or inoperative, as before described, controls the operation of said sections of the lifter-board. Furthermore, each section of the lifter-board instead of extending laterally completely across the entire series of needles is itself composed of sections—that is to say, it is made up of a number of independent bars 21, one for each vertical row of needles—and the bars of both sections of the lifter-board can be raised by connection with a general lifter-board 22 at the top of the machine, this general lifter-board having for each bar of each section of the sectional lifter-board a pair of depending knotted cords 23, operating in conjunction with special notched eyes 24ª in said bar, the notches of said eyes 24ª in the bar of one section of said lifter-board facing in the opposite direction from those of the eyes 24ª in the bar of the other section, and the knots of the lifting-cords 23 being below the bars 21, so that when said cords 23 are controlled by the qualifying-needle 11 they will in one position of said needle engage with the notches of the eyes 24ª of a bar of one section of the lifter-board and when in the other position will engage with the notches of the eyes 24ª of the corresponding bar of the other section of the board. It will be evident, therefore, that by the simple manipulation of the needles 11 the bars of either section of the board may be rendered operative—that is to say, may be raised on the rise of the general lifter-board 22. Each bar of each section of the lifter-board controls four harness-cords, three of these harness-cords being normally inoperative and each pushed into its respective notch by the operation of its corresponding needle 12, 13, or 14, while the fourth cord of each set is normally in its notch, but is moved therefrom by the operation of either needle, remaining operative only when all three of the needles 12, 13, and 14 are permitted to remain in their retracted position.

Figs. 27 to 34, inclusive, are diagrams illustrating the operation of the needles and harness-cords in order to actuate any one of the latter in a machine of the character shown in Figs. 24 and 25. In that form of machine shown in Fig. 26 I have combined the principles of the divided lifter-board, of which each section is composed of a series of bars, one for each vertical row of needles, and the qualifying-needle 11 for determining which bar of either section of the lifter-board shall be raised, with a qualifying-needle $11^a$, which determines which of the threads of the lifted bar shall be engaged thereby, so that in this class of machine constructed as shown—that is, with two threads to each bar controlled only by the needles 12, 13, and 14, and four threads to each bar controlled by the joint action of the needles 12, 13, and 14, and the qualifying-needle $11^a$—I am enabled by the use of four needles to control the operation of any one of twelve harness-cords, the positions of the needles for the control of each of the twelve cords being shown in the diagrams, Figs. 35 to 46, inclusive.

In Fig. 47 I have shown a simple construction in which four harness-cords are controlled by one operating-needle 25 and two qualifying-needles $11^c$ and $11^d$, the operating-needle and one of the qualifying-needles being controlled by a card and the other qualifying-needle being connected by a lever 19 to that which is controlled by the card. In this case all four of the harness-cords are controlled by the one operating-needle, the single lifter-board having two eyes with right-hand notches and two eyes with left-hand notches, one of the qualifying-needles $11^c$ operating in conjunction with one pair of harness-cords and the other qualifying-needle $11^d$ operating in conjunction with the other pair of harness-cords.

The diagrams Figs. 48 to 51, inclusive, illustrate clearly the operation of the needles, whereby either one of the four harness-cords may be called.

In Fig. 52 I have represented somewhat the same idea as that represented in Fig. 47, but applied to a jacquard-machine of greater capacity. In this case there are three sets of eight harness-cords each and three sets of five needles each, one set of needles for each set of harness-cords. There is one operating-needle 25 and four qualifying-needles $11^c$, $11^d$, $11^e$, and $11^f$, the qualifying-needles $11^c$ and $11^e$ being acted upon by the cards on the cylinder and being connected, respectively, to the qualifying-needles $11^d$ and $11^f$ by means of levers 19. The eyes of the lifter-board are arranged in pairs with their notches facing in opposite directions, and the harness-cords of the set are likewise arranged in pairs corresponding with the pairs of eyes in the lifter-board. When the needles are all in their normal position, as shown in Fig. 53, the harness-cord 1 is in position to be called, and the calling of any other one of the harness-cords can be effected by movement of the needles, as represented in Figs. 54 to 60, inclusive.

Figure 62:
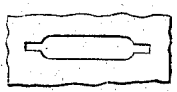
Figure 57:
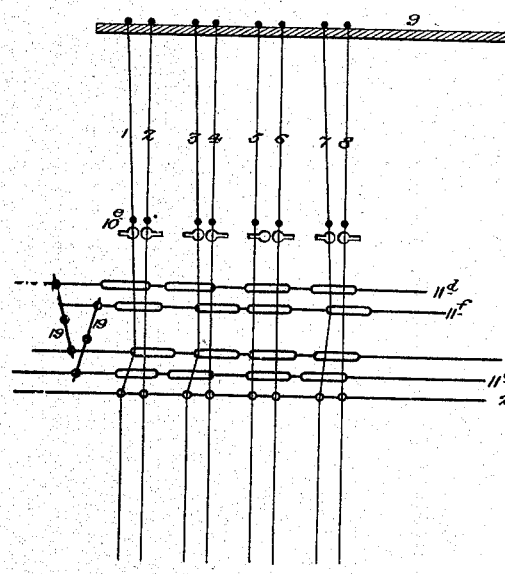
Figure 58:
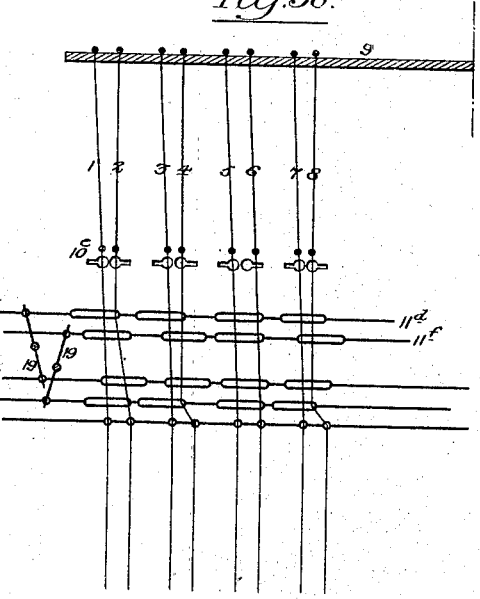
Figure 59:
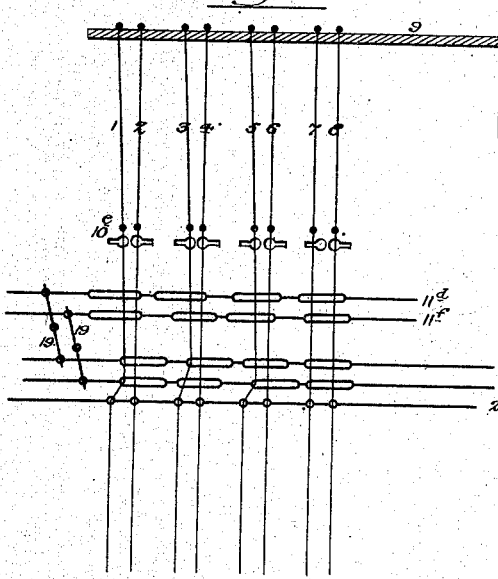
Figure 60:
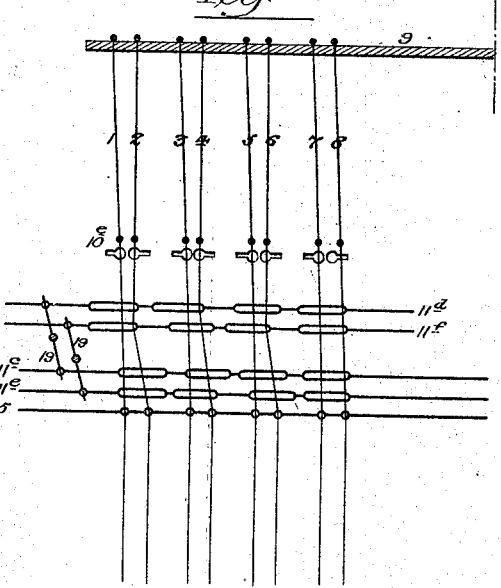

In order that the nine card-operated needles may be disposed closely together, so as to be operated by a single card, the three sets of card-operated needles are of different lengths. Thus the upper set is the shortest and is flanked by the qualifying-needles $11^d$ and $11^f$ of the intermediate set of card-operated needles, which in turn is shorter than the lowermost set and is flanked by the qualifying-needles $11^d$ and $11^f$ of the latter, and in order that the lifter-board may be as close to the needles as possible said lifter-board is composed of three sections $10^c$, $10^d$, and $10^e$, disposed in different horizontal planes, the section $10^c$ operating in connection with the lowermost set of needles, the section $10^d$ operating in connection with the intermediate set of needles, and the section $10^e$ operating in connection with the uppermost set of needles. In this case also I have provided a lower supporting-board $9^a$ for the harness-cords, the latter having a lower set of knots for resting upon said board and the length of the cord between the upper and lower supporting-boards being slightly in excess of the distance between said boards, so as to have a limited amount of slack, each cord having a light weight 40, whereby it will be caused to hang vertically when free from any influence tending to move it out of the vertical line. By this means that portion of each harness-cord which is acted upon by the needles is subjected to but slight tension. Hence the movement of the harness-cords by the needles can be effected more readily than if they had to carry the weight of the mails and lingoes. When the arrangement of needles and harness-cords here shown is adopted, I am enabled to operate the twenty-four harness-cords with but nine card-operated needles.

Where space is limited, the pairs of eyes in the lifter-board may merge—as shown, for instance, in Fig. 62, Sheet 7; but the use of independent eyes is preferred in order to prevent possibility of entanglement of the harness-cords.

Thus far I have illustrated my invention as employed in connection with notched lifter-boards; but it will be evident that the idea of the qualifying-needle can be adopted as well in connection with that class of jacquard-machines in which griff-bars operate in conjunction with hooked lifter-wires, and in Fig. 61 I have shown in diagrammatic form a jacquard-machine of this character, 30 representing the griff-bars; 31, the hooked lifter-wires; 11ª, the qualifying-needle, and 12, 13, and 14 the patterning-needles of the jacquard.

In the claims I have adopted the term "duplex lifter" to indicate either a single lifter-board having oppositely-notched sets of eyes, a griff-frame having oppositely-set bars, a sectional board having one section movable independently of the other, or equivalent constructions, and I have used the term "harness units" to indicate either the knotted harness-cords, the hooked lifter-wires, or other devices which may be acted upon by the lifter in order to raise or lower the harness-threads, the term "operating-needles" being used to indicate those needles which are acted upon by the card and in turn act directly upon the harness units to move the same into or out of operative position, and the term "qualifying-needles" being applied to those needles which modify or partly neutralize the action of the operating-needles.

Having thus described my invention, I claim and desire to secure by Letters Patent—

1. The combination in jacquard mechanism for looms, of the harness units, a lifter therefor, operating-needles disposed transversely to the harness units and normally in connection therewith for adjusting the same in respect to the lifter, and qualifying-needles whereby the normal action of the operating-needles upon some of the harness units is neutralized, substantially as specified.

2. The combination in jacquard mechanism for looms, of the harness units, a lifter therefor, operating-needles each controlling two or more of said harness units and normally in connection therewith, and means whereby the action of the operating-needle upon one or more of the harness units controlled thereby, is neutralized, substantially as specified.

3. The combination in a jacquard-machine, of the duplex lifter, the harness units, operating-needles normally in connection with said harness units, and qualifying-needles for partially neutralizing the action of the operating-needles upon the harness units, substantially as specified.

4. The combination in a jacquard-machine, of a duplex lifter-board with notched eyes, harness-cords, operating-needles normally in connection with said cords, and qualifying-needles for partially neutralizing the action of the operating-needles upon the said harness-cords, substantially as specified.

5. The combination in a jacquard-machine, of the duplex lifter, the harness units, operating-needles each normally in connection with two or more of said harness units, and qualifying-needles whereby the action of the operating-needles upon one or more of the harness units controlled thereby may be neutralized, substantially as specified.

6. The combination in a jacquard-machine, of a sectional lifter having each section composed of independent bars, one or more for each vertical row of needles, harness units lifted by said bars, operating-needles normally in connection with said harness units, and qualifying-needles for determining which of the sections of the lifter shall be operative, substantially as specified.

7. The combination in a jacquard-machine, of a sectional lifter, each section being composed of bars, one or more for each vertical row of needles, harness units operated by said bars, operating-needles normally in connection with said harness units, qualifying-needles whereby either section of the lifter may be rendered operative, and other qualifying-needles for neutralizing the action of the operating-needles upon certain of the harness units, substantially as specified.

8. The combination in a jacquard-machine, of a lifter-board having notched and elongated eyes, harness-cords actuated by said board, operating-needles normally in connection with said harness-cords, and qualifying-needles for neutralizing the action of the operating-needles upon certain of the harness units, substantially as specified.

9. A jacquard-machine having a lifter-board composed of sections in different horizontal planes in combination with harness units controlled by said lifter-board and needles engaging said harness units and disposed in a plane at a right angle to that in which the lifter-board moves, substantially as specified.

10. The combination in a jacquard-machine, of a lifter-board composed of sections in different horizontal planes, harness units operated by said lifter-board, operating-needles in a plane at a right angle to that in which the lifter-board moves and each acting upon two or more of said harness units, and qualifying-needles whereby the action of the operating-needles upon some of said harness units is neutralized, substantially as specified.

11. The combination of the lifter, the harness-cords and the needles of a jacquard-machine, said harness-cords having upper and lower supporting-knots, with a lower supporting-board closer to the upper supporting-board than the distance between the supporting-knots on the harness-cords, whereby there will be a slight amount of slack in the harness-cord between the two boards, substantially as specified.

12. The combination of the lifter, the harness-cords and the needles of a jacquard-machine, said harness-cords having upper and lower supporting-knots, with a lower supporting-board closer to the upper supporting-board than the distance between the supporting-knots on the harness-cords, whereby there will be a slight amount of slack in the harness-cord between the two boards, and means for weighting said interposed portions of the harness-cord, substantially as specified.

13. The combination in jacquard mechanism for looms, of a lifter, harness units lifted thereby, operating-needles normally in connection with said harness units, and two or more qualifying-needles for each of said operating-needles, said qualifying-needles partially neutralizing the action of the operating-needles upon the harness units of the machine, substantially as specified.

14. The combination in jacquard mechanism for looms, of a lifter, harness units, a set of operating-needles each controlling one or more of said harness units, and other harness units each controlled by all of the needles of the set, whereby one of said latter harness units will be rendered operative when all of the needles of the set are projected and the other when neither of the needles of the set is projected, substantially as specified.

In testimony whereof I have signed my name to this specification in the presence of two subscribing witnesses.

HARRY HARDWICK.

Witnesses:
F. E. BECHTOLD,
JOS. H. KLEIN.